US008217930B2

(12) United States Patent
Campbell et al.

(10) Patent No.: US 8,217,930 B2
(45) Date of Patent: Jul. 10, 2012

(54) FAST TRANSITIONS OF LARGE AREA CHOLESTERIC DISPLAYS

(75) Inventors: Patrick M. Campbell, Saint Paul, MN (US); Erich C. Walter, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 369 days.

(21) Appl. No.: 12/548,999

(22) Filed: Aug. 27, 2009

(65) Prior Publication Data

US 2011/0050678 A1 Mar. 3, 2011

(51) Int. Cl.
*G06F 3/038* (2006.01)

(52) U.S. Cl. ......................... 345/214; 345/644; 345/212

(58) Field of Classification Search ........................ None
See application file for complete search history.

(56) References Cited

U.S. PATENT DOCUMENTS

| | | | |
|---|---|---|---|
| 4,241,344 | A | 12/1980 | Kmetz et al. |
| 4,386,350 | A | 5/1983 | Ogawa |
| 4,890,902 | A | 1/1990 | Doane et al. |
| 5,384,067 | A | 1/1995 | Doane et al. |
| 5,453,863 | A | 9/1995 | West et al. |
| 5,644,330 | A | 7/1997 | Catchpole et al. |
| 5,748,277 | A | 5/1998 | Huang et al. |
| 5,933,203 | A | 8/1999 | Wu et al. |
| 6,034,752 | A | 3/2000 | Khan et al. |
| 6,133,895 | A | 10/2000 | Huang |
| 6,154,190 | A | 11/2000 | Yang et al. |
| 6,268,840 | B1 | 7/2001 | Huang |
| 6,710,760 | B1 | 3/2004 | Johnson et al. |
| 6,717,561 | B1 | 4/2004 | Pfeiffer et al. |
| 6,784,968 | B1 | 8/2004 | Hughes et al. |
| 6,894,668 | B2 | 5/2005 | Mi et al. |
| 7,307,608 | B2 | 12/2007 | Stephenson et al. |
| 2001/0048414 | A1 | 12/2001 | Yamakawa et al. |
| 2002/0067323 | A1 * | 6/2002 | Bird et al. ....................... 345/87 |
| 2004/0246221 | A1 | 12/2004 | Izumi |
| 2008/0042959 | A1 | 2/2008 | Ben-Shalom et al. |
| 2008/0108727 | A1 | 5/2008 | Roberts et al. |

FOREIGN PATENT DOCUMENTS

| | | |
|---|---|---|
| KR | 2003-0052496 | 6/2003 |
| WO | WO 2008/08130 | 1/2008 |

OTHER PUBLICATIONS

U.S. Appl. No. 12/141,544, filed Jun. 18, 2008, Titled: Conducting Film or Electrode with Improved Optical and Electrical Performance.
A. Khan et al., Novel Drive Techniques and Temperature Compensation Mechanisms in Reflective Cholesteric Displays, SID 04 Digest, p. 886-889 (2004).

* cited by examiner

*Primary Examiner* — Muhammad N Edun

(57) ABSTRACT

A gray scale drive scheme for passive matrix displays, more specifically cholesteric liquid crystal displays. Prior to writing an image, the display can be given a black appearance by first driving the pixels to a homeotropic state, then driving the pixels to a focal conic state. The drive scheme then resets pixels by driving the selected pixels to a homeotropic state. Selecting and non-selecting row voltage signals are then used in combination with column voltage signals to write an image to the display.

20 Claims, 10 Drawing Sheets

FAST TRANSITIONS OF LARGE AREA CHOLESTERIC DISPLAYS

FIELD OF THE INVENTION

The present disclosure relates to drive schemes for passive matrix display systems. More specifically, the present disclosure relates to two-stage gray scale drive schemes for cholesteric liquid crystal display systems.

BACKGROUND

Cholesteric liquid crystal displays (ChLCD's) have existed for several decades. ChLCD's are unique because of their "nonvolatile memory" characteristic; once an image is written to a display, the current image will remain indefinitely until a new image is written. ChLCD's can also be viewed in ambient light without back lighting. Both of these characteristics significantly reduce total power consumption when compared to other displays.

When many ChLCD's are refreshed or the displayed image is changed, the pixels are first driven to a uniform reflective state, then the new image is written to the display. This reflective state appears as a white flash to viewers.

There exists a need for a simple drive scheme that achieves gray scale reflection for passive matrix displays and eliminates the appearance of a white flash when a new image is written to a ChLCD.

SUMMARY

One aspect of the present disclosure includes a method for driving at least a portion of a passive matrix display system having rows and columns forming pixels. The method includes driving the portion of the passive matrix display system to a homeotropic state by outputting a first voltage pulse to the rows. Next, it includes driving the portion of the passive matrix display system to a focal conic state. The portion of the passive matrix display system is then driven to a homeotropic state by outputting a second voltage pulse to the rows. The method further includes waiting for a predetermined period of time within the range of 1 microsecond to 6 milliseconds. The waiting step is followed by outputting to the rows a first row voltage signal, wherein the first row voltage signal is applied to the row of the matrix being written; and outputting to the rows a second row voltage signal, wherein the second row voltage signal is applied to the rows of the matrix not being written.

Another aspect of the present disclosure includes a system for driving a display. The system includes a passive matrix display having rows and columns forming pixels, a drive circuit and a controller. The drive circuit is configured to drive a portion of the passive matrix display system to a homeotropic state by outputting a first voltage pulse to the rows. Next, it drives the portion of the passive matrix display system to a focal conic state. The portion of the passive matrix display system is then driven to a homeotropic state by outputting a second voltage pulse to the rows. The drive circuit then waits for a predetermined period of time within the range of 1 microsecond to 6 milliseconds. The waiting step is followed by outputting to the rows a first row voltage signal, wherein the first row voltage signal is applied to the row of the matrix being written; and outputting to the rows a second row voltage signal, wherein the second row voltage signal is applied to the rows of the matrix not being written. The controller is electrically coupled to the passive matrix display and the drive circuit, wherein the controller controls the first and second voltage pulse and the first and second row signal.

DETAILED DESCRIPTION

Cholesteric Liquid Crystal Display and Electrical System

Figure 1:
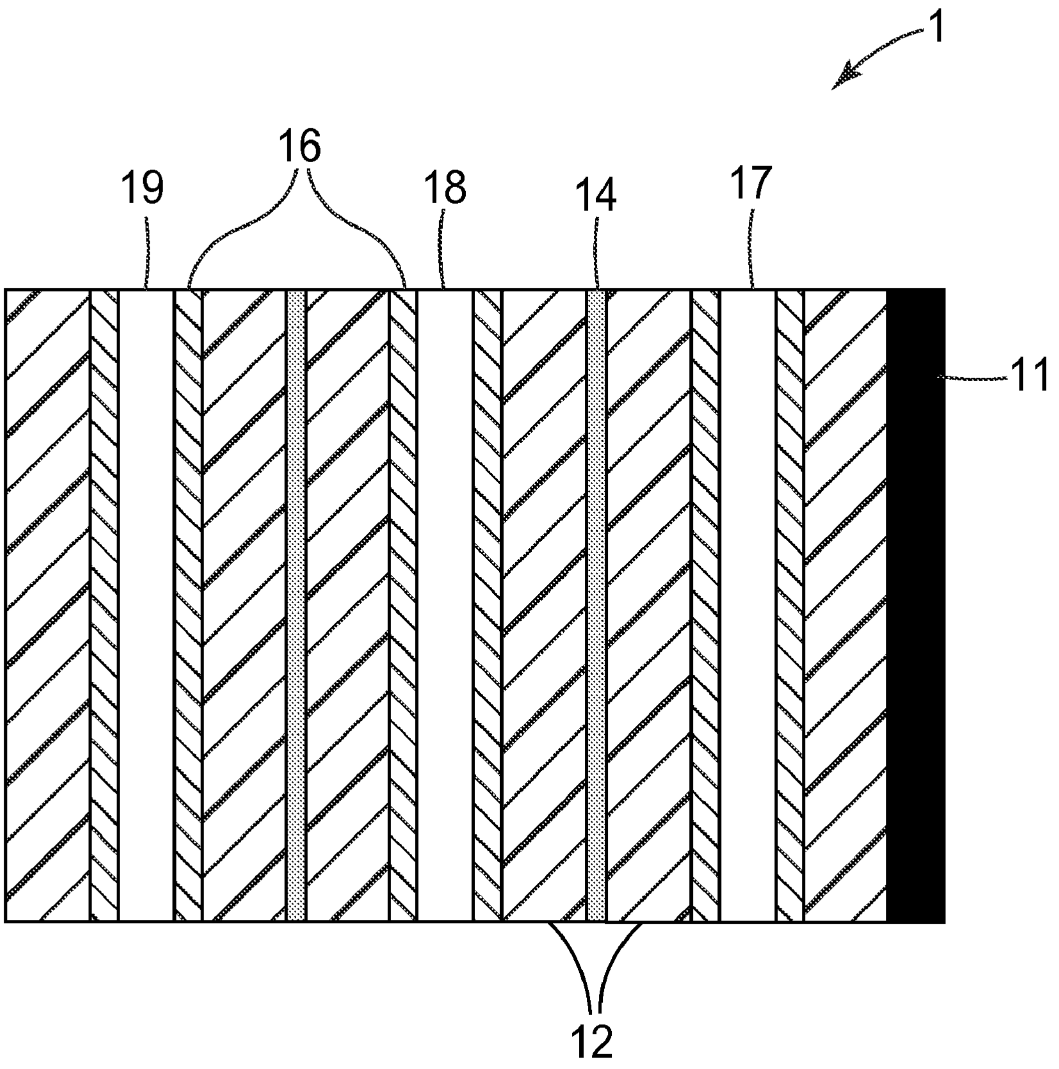
FIG. 1 Prior Art
FIG. 1 shows a cross-sectional view of a portion of an exemplary cholesteric liquid display module.

The current disclosure includes a passive matrix display, which may be, for example, a cholesteric liquid crystal display as shown in FIG. 1. An exemplary ChLCD is described in U.S. Pat. No. 5,453,863, incorporated herein by reference as if fully set forth. Alternatively, other types of passive matrix displays may be used. The exemplary ChLCD module shown in FIG. 1 contains three active layers 17, 18, 19. The active layers can correspond with the colors red 17, green 18 and blue 19, and each layer can be addressed by its own pair of electrodes 16. An electrode can be made from a material such as indium-tin oxide (ITO) or any other appropriate material, such as a transparent or semitransparent polymer or inorganic material. A display may contain fewer active layers or more active layers than shown in FIG. 1. For example, a display may contain multiple active layers for certain colors or additional contrast layers. Each active layer can be driven independently or two or more active layers can be driven by the same drive circuit, for example, when the active layers are the same color.

Figure 2:
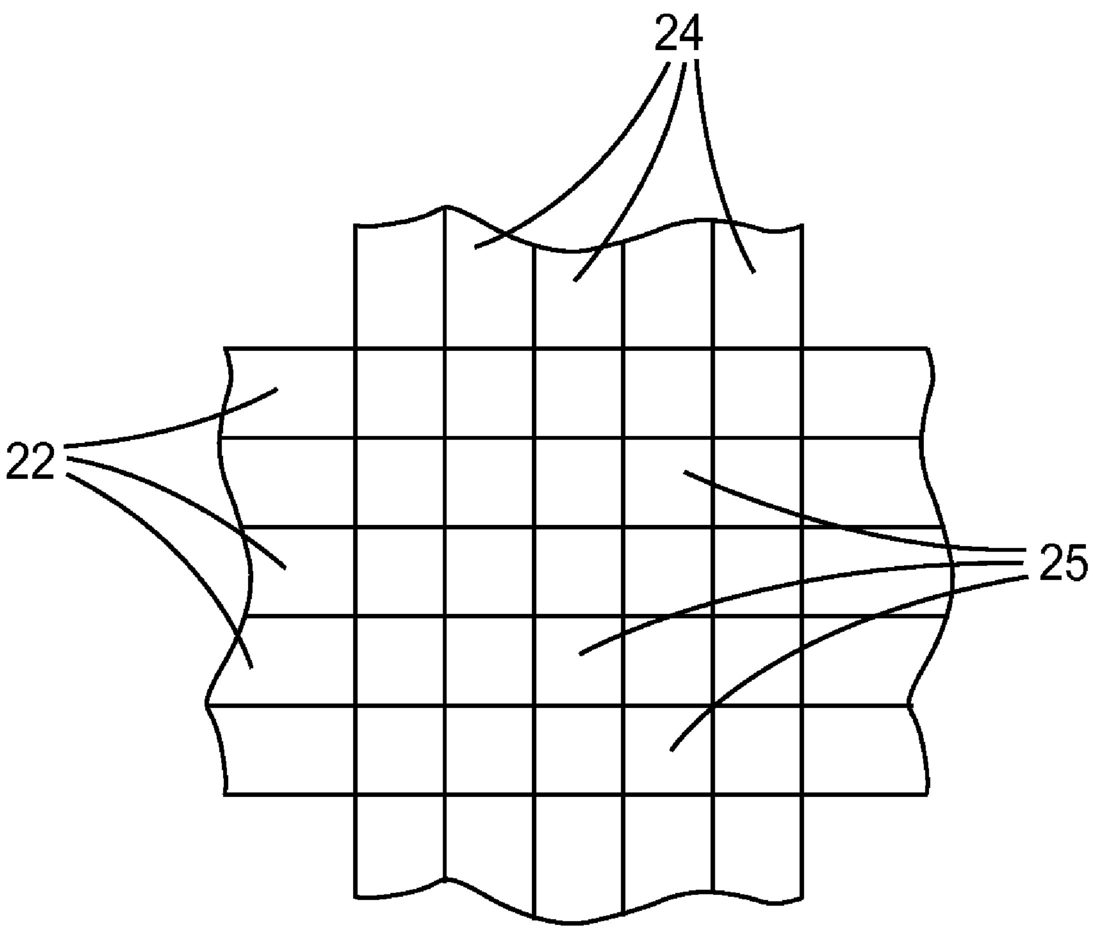
FIG. 2 Prior Art
FIG. 2 shows a schematic diagram of an active layer of a ChLCD containing rows, columns and pixels.

As shown in FIGS. 1 and 2, each active layer 17, 18, 19 can include a matrix of rows 22 and columns 24 forming pixels 25 that can be controlled individually. Active layers 17, 18, 19 of ChLCD's are typically composed of a chiral nematic liquid crystal material and a cell wall structure. The cell wall structure and the liquid crystal cooperate to form focal conic, planar, and homeotropic textures in response to different field conditions. Homeotropic states are transient while focal conic and planar states are generally stable. Applying an electric field can change the optical state of the material to a new state to reflect any desired level of reflection along a continuum of such states, thus creating a "gray scale." After the electric field is removed, the current state will remain indefinitely.

A layer of substrate 12 can be disposed on each side of the active layers for a total of six layers of substrate 12 within the display stack. Alternatively, for example, a single layer of substrate 12 can be disposed between active layers and on each end of the stack for a total of four layers of substrate 12. Any number of substrate layers 12 can be arranged in any suitable manner. Active layers 17, 18, 19, each surrounded by a conductor 16 and substrate 12, can then be joined with a total of two layers of adhesive 14 to create a full color ChLCD.

In one embodiment, a conductive layer 16 can include an intervening layer (not shown) disposed between two or more layers of conductive materials. The conductive and intervening layers can each be transparent or semitransparent. The intervening layer can have electrically conductive pathways that enable electrical contact between the two conductive layers. The thickness of the individual layers and optical indexes of refraction of individual layers within an electrode 16 can be tuned to minimize unwanted reflections when these substrates are incorporated within a ChLC display. Use of an intervening layer is described in further detail by U.S. patent application Ser. No. 12/141,544, "Conducting Film or Electrode with Improved Optical and Electrical Performance," filed Jun. 18, 2008, incorporated herein by reference as if fully set forth.

An exemplary display 1 may also have a background layer 11. The background layer 11 absorbs light not reflected or scattered by the active layers. The background layer may be black, or alternatively, it may be any other color appropriate for light absorption. A display 1 can be enclosed in any suitable material including, but not limited to, glass or flexible plastic. In one embodiment, each layer within a display consistent with the present disclosure can be flexible so that the entire display is flexible.

Figure 3:
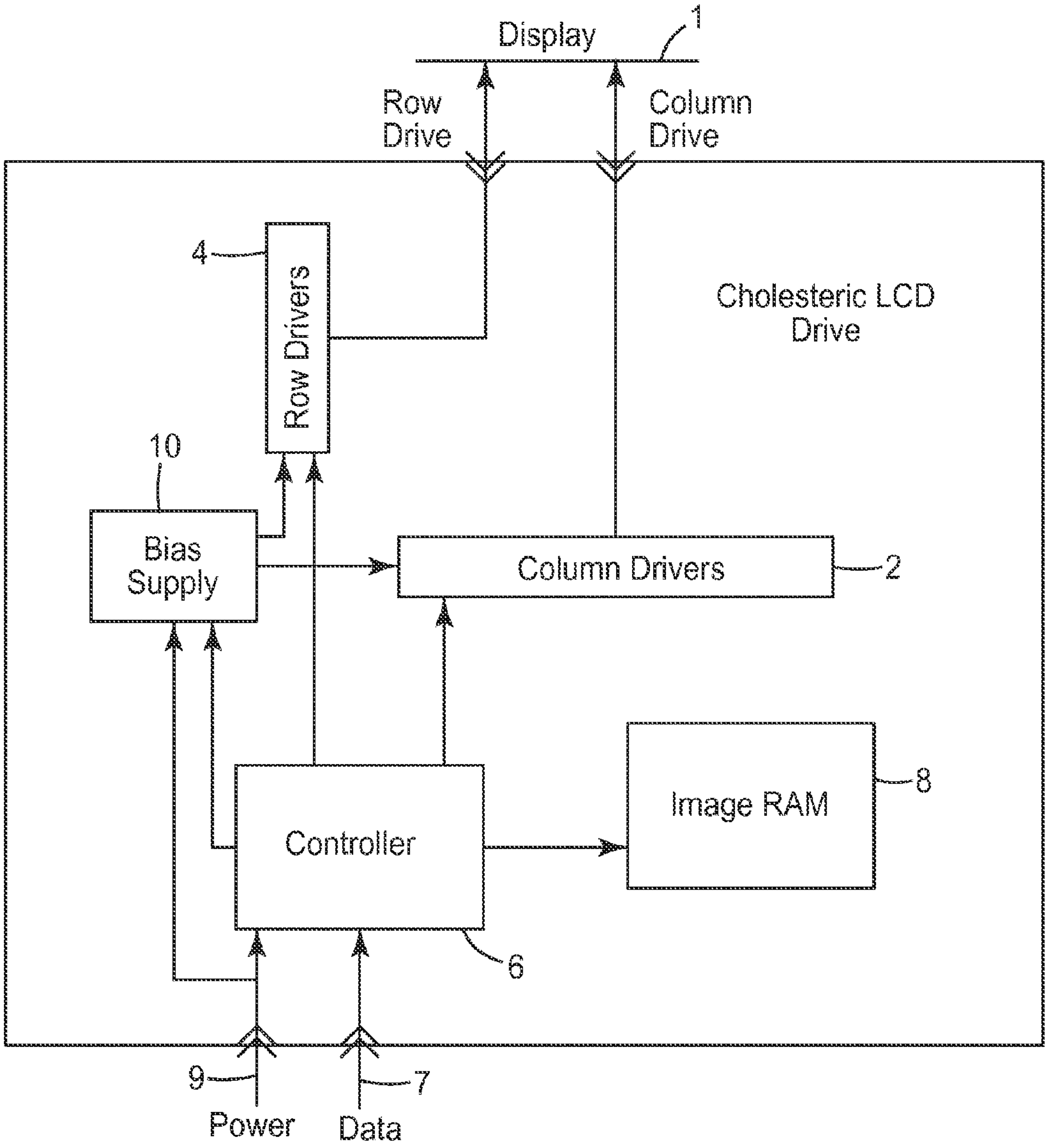
FIG. 3 Prior Art
FIG. 3 shows a block diagram of an exemplary system for driving a ChLCD module.

FIG. 3 shows a block diagram of an exemplary system for driving a display 1 consistent with the present disclosure. Each active layer of the display 1 can be driven by a drive circuit including both a column driver 2 and a row driver 4. The signals propagated by the column driver 2 and row driver 4 intersect to control the state of each individual pixel. Alternatively, a voltage can be applied by using only column or only row drivers. The column driver 2 and row driver 4 can include a single electronic device or two or more electronic devices. For example, the HV633PG, a 32-channel 128-level display driver manufactured by Supertex, Inc. can be used. Each driver 2, 4 can be powered by a bias voltage supply 10. The bias voltage supply 10 can be monitored by the controller 6 and powered by a power source 9, which also provides power to the controller 6. For example, the controller 6 could be a PIC microcontroller made by Microchip Technology, Inc. Alternative power, voltage, controller and driver configurations consistent with the present disclosure will be apparent to individuals skilled in the art. The controller is electrically coupled to the display 1 and to the drive circuit, including the column drivers 2 and the row drivers 4.

When writing a desired image to a display 1, the controller 6 receives input data 7 from an outside source, for example, a user interface, regarding what image or images should be displayed. The controller 6 then accesses the associated image data stored in RAM 8. Using this information, the controller transmits data to the column driver 2 and row driver 4 indicating what signal should be applied to each row and each column of the display, along with the appropriate number of periods over which the signal should be transmitted. The display can be floated at a constant positive or negative voltage level to allow an AC voltage signal to range from zero or some lower positive voltage to a higher positive voltage or from a lower negative voltage to zero, or a higher negative voltage.

When an image is being written to a display, each pixel 25 in a display as shown in FIG. 2 can receive a row voltage signal and a column voltage signal simultaneously. The row voltage signal and column voltage signal correspond to the row 22 and column 24 which intersect at the location of the pixel 25. In the exemplary embodiment described below, the total voltage applied to a pixel at any given point in time is the difference between the row voltage signal and column voltage signal that intersect at that pixel.

An exemplary display can be any appropriate size and have any desired and workable resolution. For example, a display may have a resolution in the range of 1 dpi to 10 dpi, or any other appropriate resolution.

Pixel Response

Figure 4:
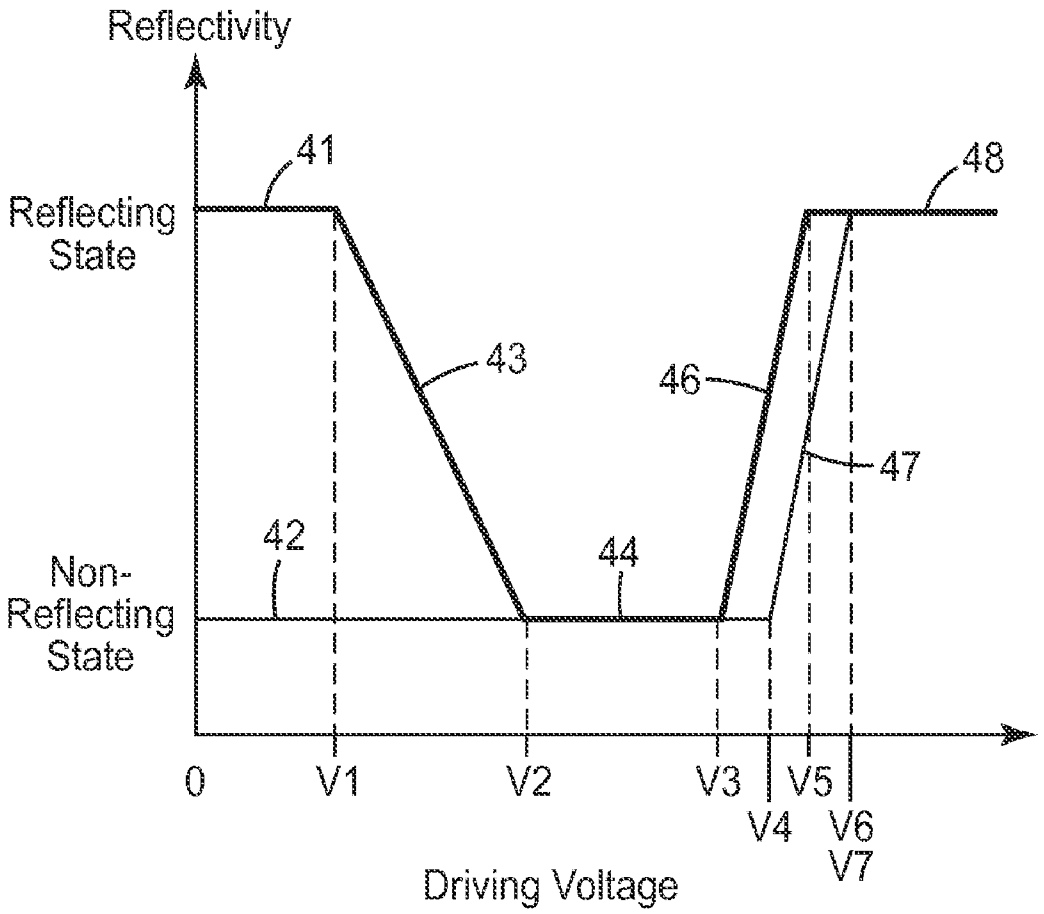
FIG. 4 Prior Art
FIG. 4 shows a diagram illustrating the reflectivity of a cholesteric liquid crystal pixel versus an amount of voltage applied to the pixel.

FIG. 4 illustrates a response of a pixel in an active layer to varying voltage levels. Examples of appropriate ranges for voltage levels are in Table 1 below.

TABLE 1

Voltage levels and corresponding example ranges.

| Voltage Level | Example Range |
|---|---|
| V1 | 3-10 V |
| V2 | 5-10 V |
| V3 | 10-25 V |
| V4 | 10-31 V |
| V5 | 10-31 V |
| V6 | 20-40 V |
| V7 | 20-100 V |

The response of a pixel to a given voltage level is dependent on the initial pixel state. When a pixel is initially in a planar reflective state 41, application of a sufficiently low voltage to the cell, less than V1, will not substantially change the state of the pixel. As shown in FIG. 4, a planar reflective state 41, 48 results in substantially the highest level of reflection for a given pixel. When a voltage between V1 and V2 is applied to a pixel initially in a planar reflective state, the resulting reflective state 43 is gray scale and is dependent upon, but not linearly related to, the precise level of voltage applied.

If a pixel is initially in a focal conic state 42, application of any voltage less than V4 to the pixel will not substantially change the pixel state. As shown in FIG. 4, a pixel in a focal conic state 42 has a very low level of reflection. Instead, the pixel scatters light, resulting in a dark or black appearance.

Application of a voltage between V2 and V3 to a pixel with any initial state will drive the pixel to a focal conic state 44. Application of a voltage between V3 and V5 to a pixel with an initial planar reflective state will result in a gray scale reflective state 46 dependent upon, but not linearly related to, the level of voltage applied. Application of a voltage between V4 and V6 to a pixel with an initial focal conic reflective state will result in a gray scale reflective state 47 dependent upon, but not linearly related to, the level of voltage applied. The application of a voltage greater than V6 or V7 to a pixel with any initial reflective state will drive the pixel to a homeotropic state which relaxes to become a planar reflective state 48.

Exact values of voltage levels V1, V2, V3, V4, V5, V6 and V7 shown in FIG. 4 may vary with each individual active layer in a display. Key voltage levels to be determined for each state are V3, which will drive a pixel to a focal conic state, and V5, which will drive a pixel to a planar state. Voltage levels V3 and V5 can vary depending on the color of the active layer. Exemplary voltages used for active layers 17, 18, 19 shown in FIG. 1 are shown in Table 2 below.

TABLE 2

Example voltage levels for various active display layers.

| Active Layer | V3 | V5 |
|---|---|---|
| Red 17 | 18 V | 23 V |
| Green 18 | 20 V | 26 V |
| Blue 19 | 24 V | 30 V |

Because a pixel responds to a voltage differently depending upon its initial state, it is advantageous if all pixels are initially driven to a uniform state when an image is written to a ChLC display. While pixels are traditionally driven to a planar reflective state prior to writing a new image to the ChLCD, the present disclosure provides an alternative method of transitioning between displayed images that does not produce the appearance of a bright flash between images.

Pixel Reset and Darken Methods

Figure 5:
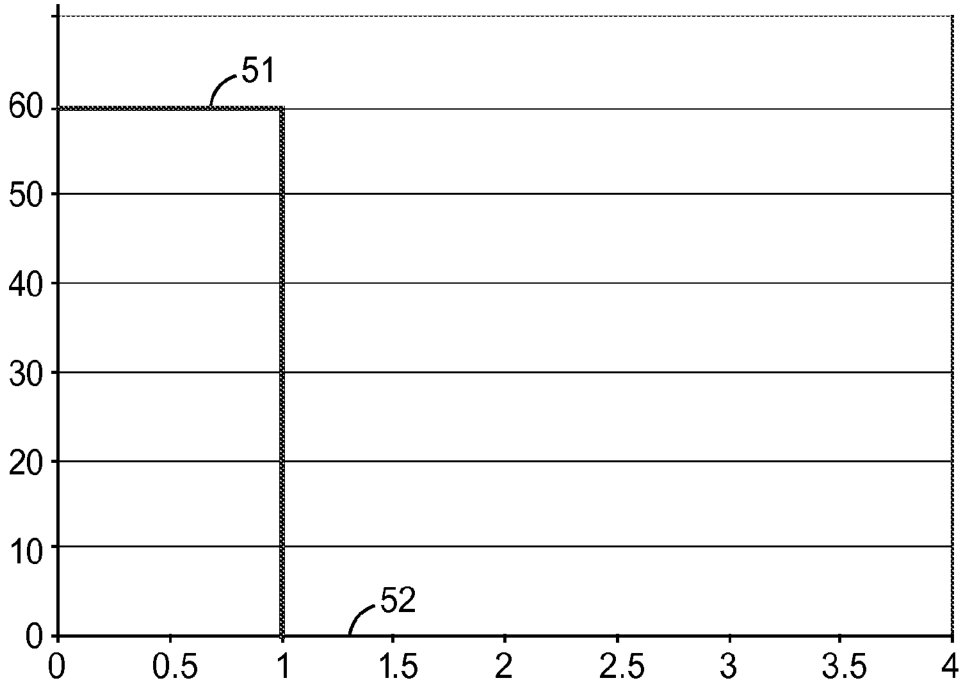
FIG. 5 shows an exemplary voltage pulse for driving pixels of a ChLCD to a homeotropic state.

The present disclosure includes a method for resetting pixels in a ChLCD prior to writing new image to a display. FIG. 5 shows an exemplary voltage pulse that can be used to reset at least a portion of the pixels in a ChLCD prior to writing an image to a ChLCD. Pixels can be reset by first driving them to a homeotropic state. When a pixel is in a homeotropic state, the chiral nematic material is configured so that the liquid crystal director is perpendicular to the cell wall. After the voltage is reduced by the completion of the voltage pulse, the liquid crystal material transitions to a transient twisted planar texture in which the chiral nematic material assumes a helical structure. Without the application of another voltage, the transient twisted planar texture will eventually transition to either the twisted planar or focal conic texture depending on conditions present.

Voltage maximum 51 of the reset voltage pulse shown in FIG. 5 can be at least as great as V7 as shown in FIG. 4, when the minimum voltage 52 is zero volts. The maximum 51 and minimum 52 can be adjusted depending upon the DC voltage level of the display. The voltage difference between maximum 51 and minimum 52 can vary depending on which active layer the voltage is being applied to (as shown in Table 2 above) along with other factors, including physical characteristics of a ChLCD. The voltage pulse frequency can be between, for example, 100 and 1,000 hertz. More preferably, it can have a frequency of about 400 hertz. While a single voltage pulse is illustrated in FIG. 5, more than one pulse could be used to drive pixels to a homeotropic state.

After applying the reset voltage pulse to the desired pixels, such as the exemplary pulse shown in FIG. 5, there can be a short delay. Such a delay creates turbulence in the pixels and can improve contrast in the final displayed image. However, if the delay is too long, the liquid crystal will relax into a reflective planar state. For example, a delay may be between 1 microsecond and 6 milliseconds. More preferably, the delay could be between 1 and 3 milliseconds, or in an exemplary embodiment, it could be about 2 milliseconds. Optimal delay length is affected by numerous factors including display size, resolution and physical and electrical properties of the display. A delay can be predetermined or can be a natural time lapse due to technological limitations.

After a delay, the desired image can be written to the display by changing each pixel in each active layer to the desired level of reflectivity. There are a variety of drive schemes that can be implemented consistent with the present disclosure, including both bipolar and unipolar drive schemes with both amplitude and pulse width voltage modulation. An example of a bipolar drive scheme is discussed in U.S. Pat. No. 6,154,190, incorporated herein by reference as though fully set forth. An exemplary unipolar drive scheme with both amplitude and pulse width modulation is discussed in further detail below.

Application of the reset method described above creates the appearance of one image directly transitioning to the next, or the new image being scrolled down over the previous image. However, it can also be desirable to transition a portion of, or the entire, ChLCD to a dark or black appearance before writing a new image. While the pixels can be reset and the image can be written to a ChLCD using an addressing method, where each pixel is written individually, all pixels in a display can be transitioned to a dark state simultaneously as described below. This decreases the total amount of time required to write an image to a ChLCD.

Figure 6:
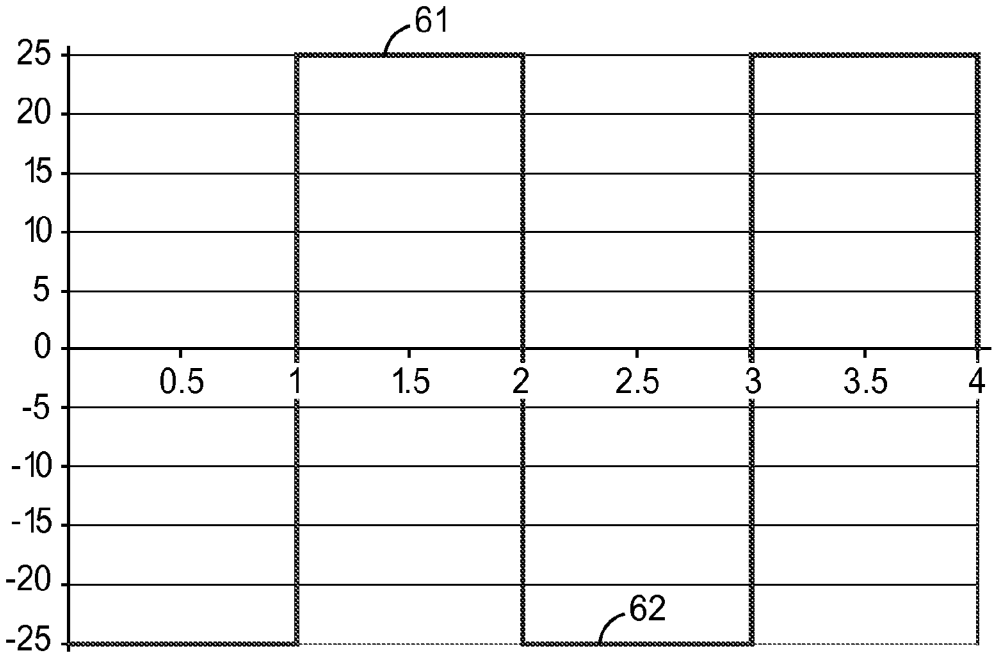
FIG. 6 shows an exemplary voltage signal over two periods for driving pixels to a focal conic state.
Figure 7A:
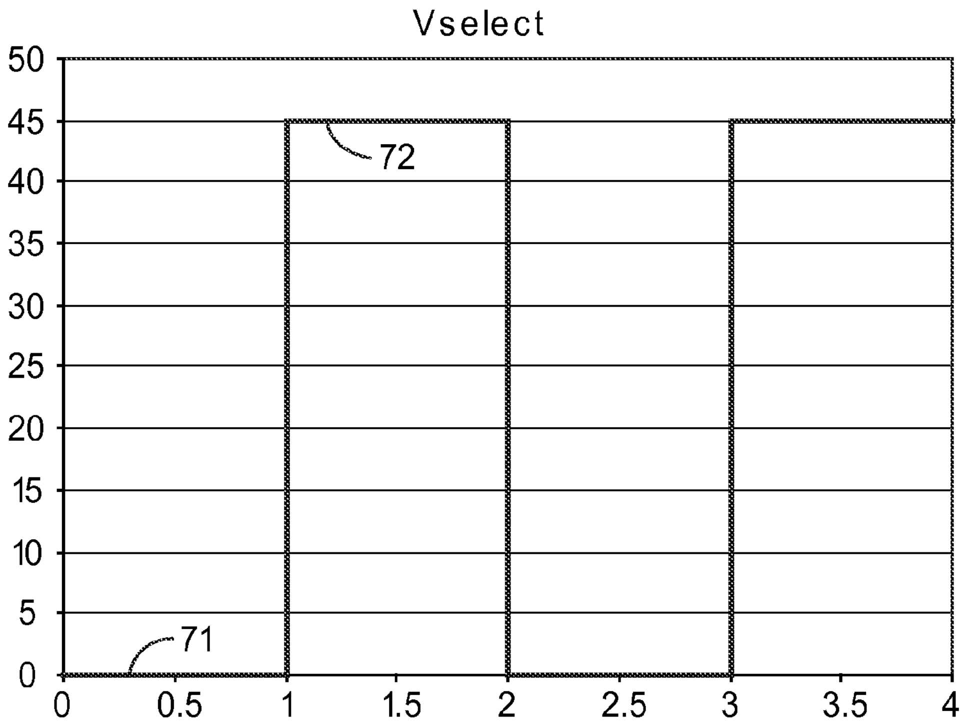
FIG. 7A shows an exemplary first row voltage signal over two periods.

Darkening the display can include two steps prior to the reset voltage pulse described above. First, the display can be driven to a homeotropic state by outputting a darken voltage pulse to all the rows or columns of the display simultaneously. The darken voltage pulse can have a similar amplitude to and a lower frequency than the reset voltage pulse shown in FIG. 5 above, or can have any other appropriate characteristics to achieve the desired homeotropic state. A pulse with a longer duration than the reset pulse can sometimes be necessary to drive the pixels in a display to a homeotropic state when the pulse is applied to all the pixels simultaneously. Once the pixels are in a homeotropic state and before the homeotropic state relaxes to a reflective planar state in which the pixels would exhibit a white appearance, the display is instead driven to a focal conic state. A select row voltage signal as shown in FIG. 7A can be applied to all the rows simultaneously and a focal conic column voltage signal as shown in FIG. 8B can be applied to all columns simultaneously, resulting in the cumulative voltage signal shown in FIG. 6, with a maximum 61 approximately equal to positive V3 and a minimum 62 approximately equal to negative V3. This combination of a high voltage darken pulse followed by the focal conic voltage erases the previous image and leaves the panel in a dark state. The darken voltage pulse and focal conic drive voltage can be applied to the pixels by the row or column drivers, or any appropriate combination of the two. After application of the darken voltage method, the desired image can be written to the ChLCD using pulse width or amplitude modulation methods.

Figure 7B:
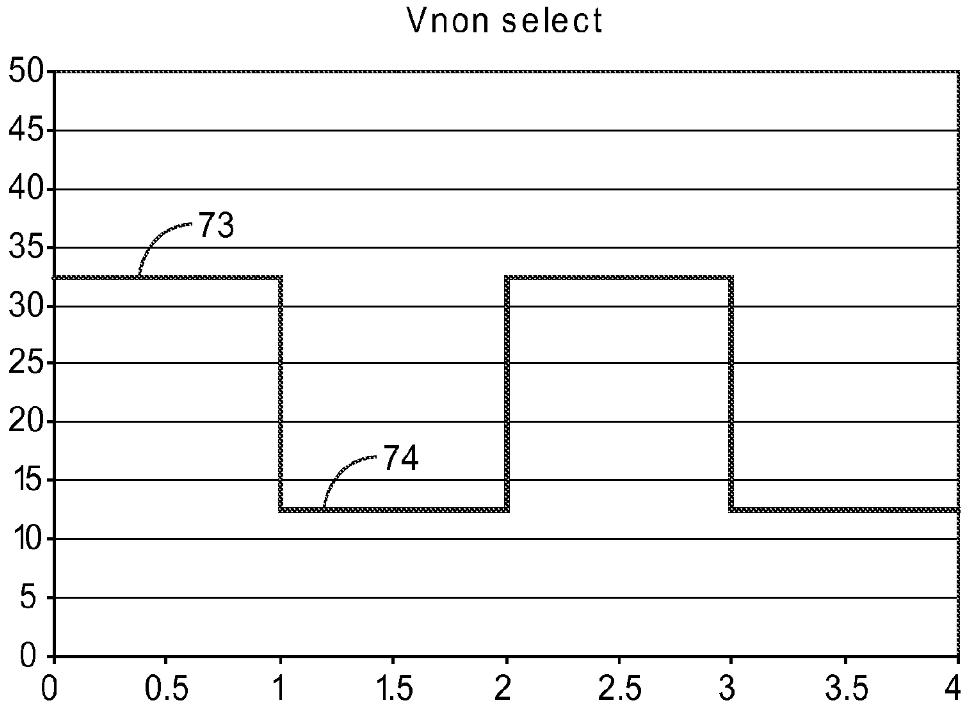
FIG. 7B shows an exemplary second row voltage signal over two periods.

FIGS. 7A-7B show exemplary row voltage signals for configurations using either amplitude modulation or pulse width modulation. Vselect, the voltage signal illustrated in FIG. 7A can be transmitted to a row currently being written. The minimum voltage level 71 is approximately equal to zero and the maximum voltage level 72 is approximately equal to V4 shown in FIG. 4. Alternatively, row voltage levels 71, 72 can be increased or decreased. If a row voltage level 71, 72 is increased or decreased, the voltage that the display is floated at should also be adjusted so that it remains at the center voltage between minimum 71 and maximum 72. FIG. 7B illustrates a voltage signal that can be transmitted to all rows not being written at any given time. Vnonselect, the voltage signal shown in FIG. 7B is 180 degrees out of phase with the voltage signal shown in FIG. 7A. The maximum voltage level 73 is approximately equal to the sum of V4 and V3 divided by two ((V4+V3)/2). The minimum voltage level 74 is approximately equal to the difference between V4 and V3 divided by two ((V4−V3)/2).

Exemplary row voltage signals in FIG. 7A-7B are shown over two periods. The length of a period can vary. An exemplary period may be 0.01 seconds, or as long as about 0.02 seconds or longer, or as short as about 0.002 seconds or shorter. The frequency of oscillation for a row voltage signal such as those shown in FIGS. 7A-7B is inversely related to the period. And exemplary frequency may be about 100 Hz, or as low as about 50 Hz or as high as about 500 Hz.

The total time required to write an exemplary display is dependent upon the display size and other physical characteristics, frequencies of each signal involved and delay time between signals. For example, a display may have materials as described in United States Patent Application Publication No. 2008/0108727 to Roberts et al., incorporated herein by reference as though fully set forth. The total drive time for a display with materials as described in US 2008/0108727 was experimentally determined. The display had a resolution of 5 dpi, 45×35 pixels, and 3 μm cell gap. When an exemplary drive circuit consistent with the present disclosure was configured to write an image to the display, the total time was approximately 557.5 ms. The pulses used with their respective frequencies and duration are shown in Table 3 below.

TABLE 3

Example drive time for a 35-line ChLCD

| Signal | Frequency (Hz) | Periods | Duration (ms) |
|---|---|---|---|
| Darken pulse to homeotropic | 100 | 1 | 10 |
| Drive display to focal conic | 100 | 4 | 40 |
| Reset pulse to 35 lines | 400 | 1 | 87.5 |
| 2 ms delay for 35 lines | | | 70 |
| Select row voltage signal for 35 lines | 100 | 1 | 350 |
| | | Total Time | 557.5 ms |

Amplitude Modulation Driver

FIGS. 8A-8D show exemplary column voltage signals for use in an amplitude modulation driving method. These column voltage signals can be used in conjunction with row signals such as the exemplary signals illustrated in FIG. 7A-7B to drive a pixel to a desired state of reflectivity. Row voltage signals and column voltage signals should have the same frequency and period.

Figure 8A:
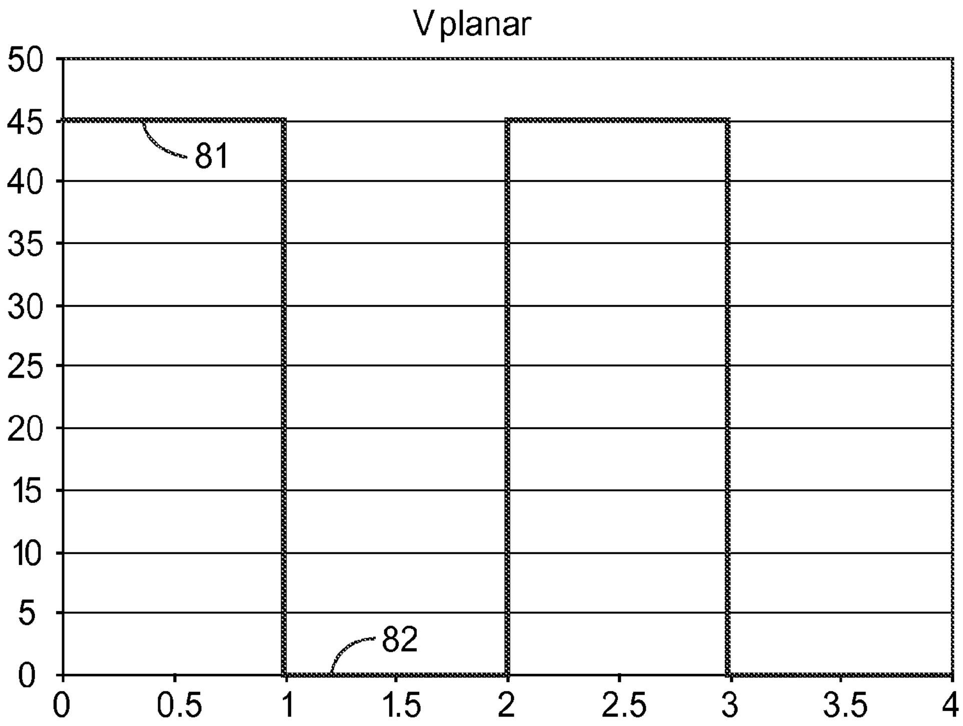
FIG. 8A shows an exemplary column voltage signal over two periods resulting in a planar state for use in amplitude modulation.
Figure 8B:
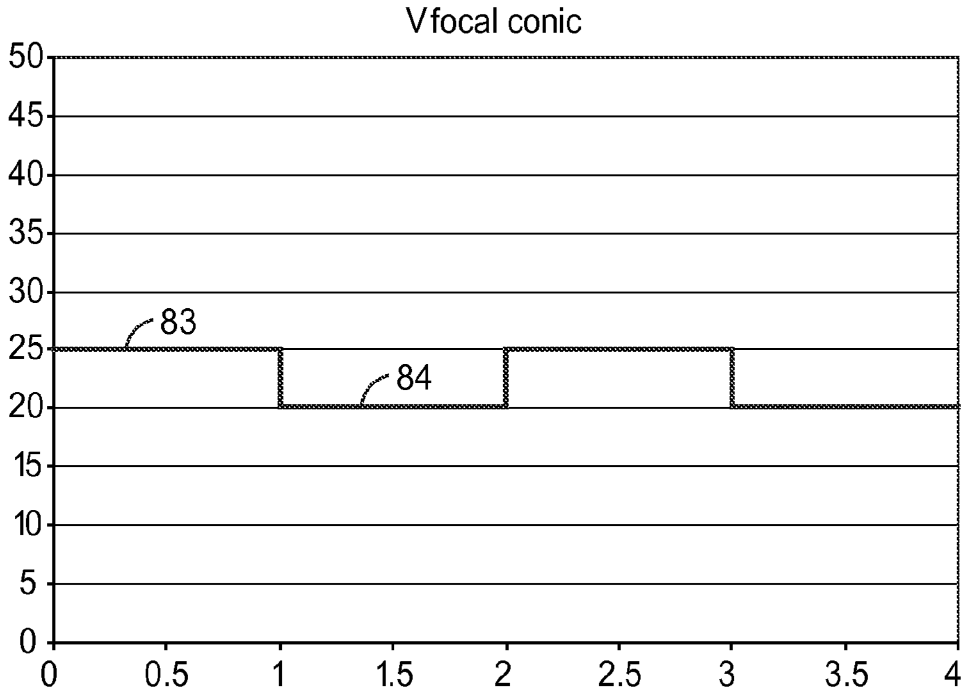
FIG. 8B shows an exemplary column voltage signal over two periods resulting in a focal conic state for use in amplitude modulation.

The column voltage signal illustrated in FIG. 8A can change a pixel's state to planar reflective. The maximum voltage level 81 is approximately equal to V4, and the minimum voltage level 82 is approximately zero. The column voltage signal shown in FIG. 8A is approximately in-phase with the row voltage signal shown in FIG. 7B. When the voltage signal shown in FIG. 8A is applied to a given column, the pixel in that column receiving a row voltage signal as illustrated in FIG. 7A will receive a cumulative voltage signal alternating between negative and positive V4, and will be changed to a planar reflective state. Pixels receiving a row voltage signal as shown in FIG. 7B will receive a cumulative voltage signal alternating between the negative and positive of the difference between V3 and V4 divided by two ((V3−V4)/2). Because the region from zero volts to V1 should not change the state of the pixel when the display is at a ground voltage level, it is preferable to use ChLCD displays that have the following characteristic: V1 is greater than or equal to the difference between V4 and V3 divided by two ((V4−V3)/2).

The column voltage signal illustrated in FIG. 8B can change a pixel's state to focal conic. The maximum voltage level 83 is approximately equal to V3 and the minimum voltage level 84 is approximately equal to the difference between V4 and V3. When the voltage signal shown in FIG. 8B is applied to a given column, the pixel in that column receiving a row voltage signal as illustrated in FIG. 7A will receive a cumulative voltage signal alternating between positive and negative V3, a voltage level sufficient to drive the pixel state to focal conic. The pixels in that column receiving a row voltage signal as illustrated in FIG. 7B will receive a cumulative voltage signal alternating between the positive and the negative of the difference between V4 and V3 divided by two ((V4−V3)/2). Because this signal is less than or equal to V1, the state of the pixels receiving this signal will not change.

Figure 8C:
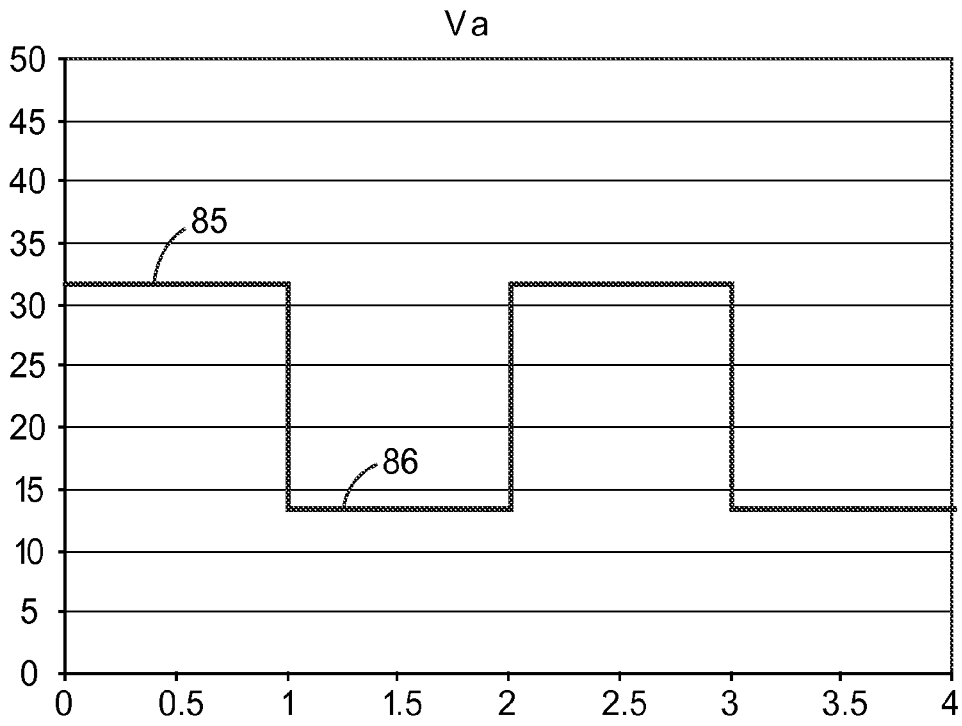
FIG. 8C shows an exemplary column voltage signal over two periods resulting in approximately twenty-five percent reflection for use in amplitude modulation.

Va, the column voltage signal illustrated in FIG. 8C can change a pixel's state to 25% of the reflection of a planar reflective level. The maximum voltage level 85 was determined by experimentally characterizing the response of a pixel to differing voltage levels and using this information to find the necessary column voltage based on row voltage levels to achieve the desired level of reflectivity. Maximum voltage level 85 was then hardwired into the controller. The minimum voltage level 86 can be determined and hardwired in the same manner.

These equations ensure that all gray scale voltage levels will be between a voltage required to produce a focal conic state and a voltage required to produce a planar state. As a result, all pixels not currently being written and receiving a voltage signal such as that shown in FIG. 7B will receive a cumulative voltage less than V1 and will not visually change from their current state.

Figure 8D:
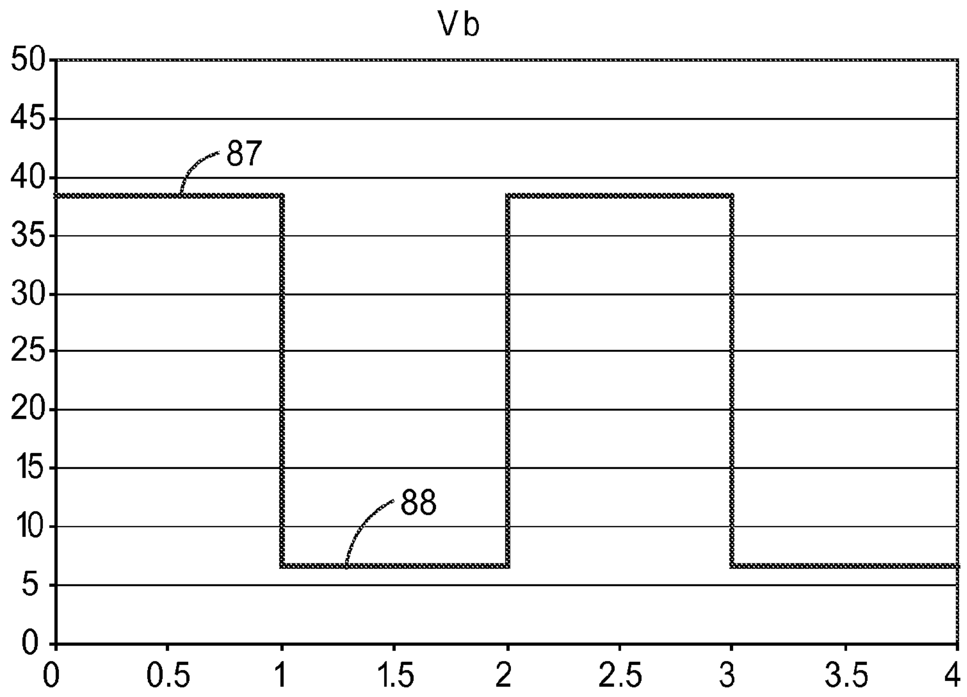
FIG. 8D shows an exemplary column voltage signal over two periods resulting in approximately seventy-five percent reflection for use in amplitude modulation.

Vb, the column voltage signal illustrated in FIG. 8D can change a pixel's state to 75% of the reflection of a planar voltage. Maximum and minimum voltage levels 87, 88 can be found using the same method used to find maximum and minimum voltage levels 85, 86.

While the four column voltage signals illustrated in FIGS. 8A-8D show voltage signals that can be used to achieve four gray scale shades, any number of shades can be achieved using experimental methods to determine minimum 86, 88 and maximum 85, 87 voltage levels. Additionally, shades can have any variety of levels and increments. For example, a four shade gray scale system can have shades for a focal conic state, thirty-three percent reflection of a planar voltage, sixty-six percent reflection of a planar voltage, and a planar reflective state.

Pulse Width Modulation Driver

Figure 9A:
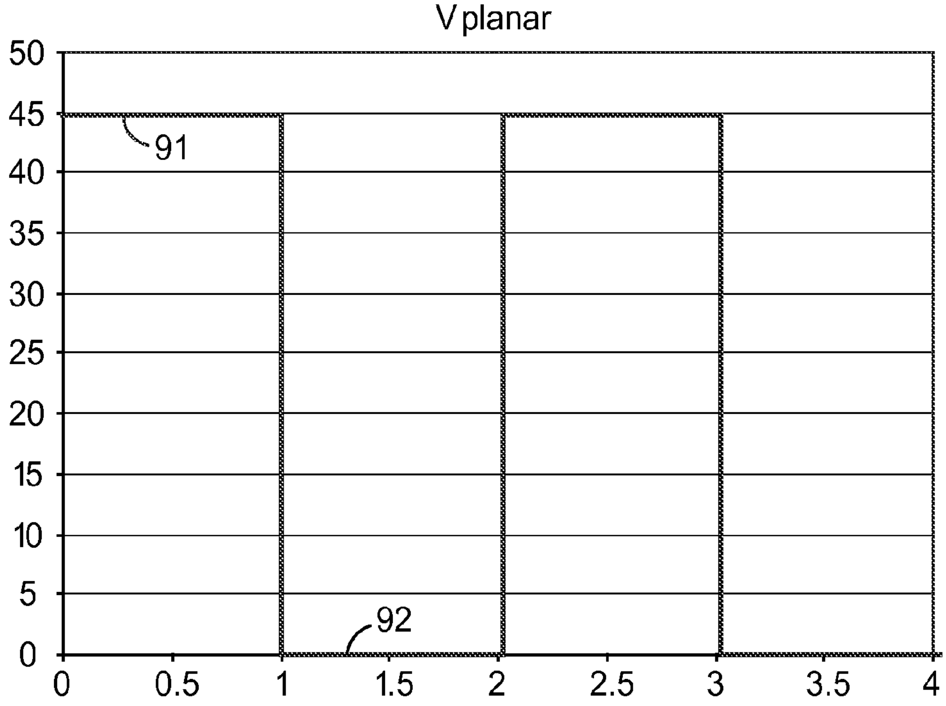
FIG. 9A shows an exemplary column voltage signal over two periods resulting in a planar state for use in pulse width modulation.
Figure 9B:
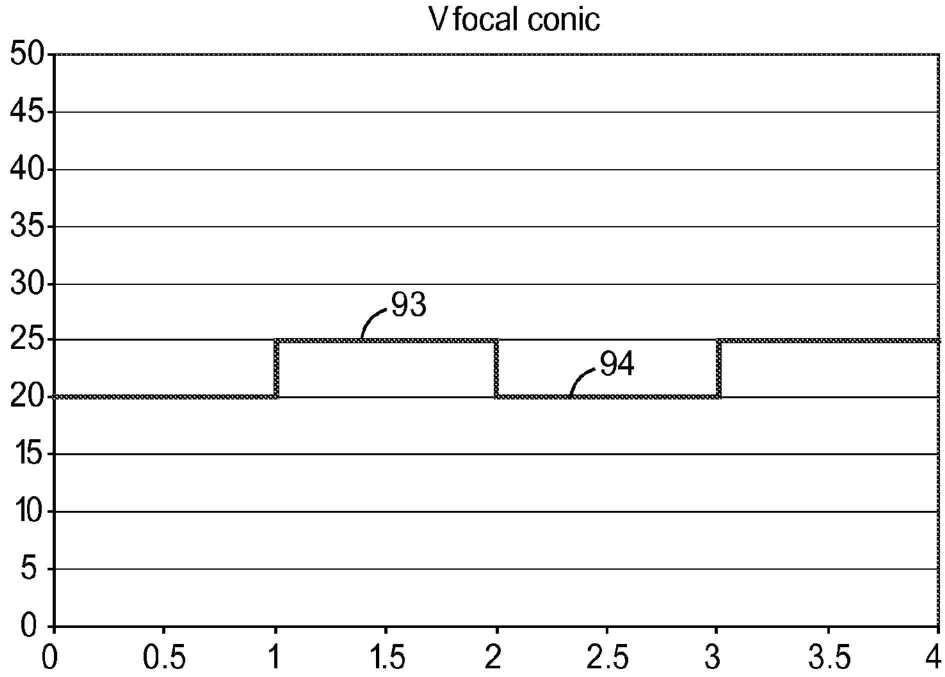
FIG. 9B shows an exemplary column voltage signal over two periods resulting in a focal conic state for use in pulse width modulation.
Figure 9C:
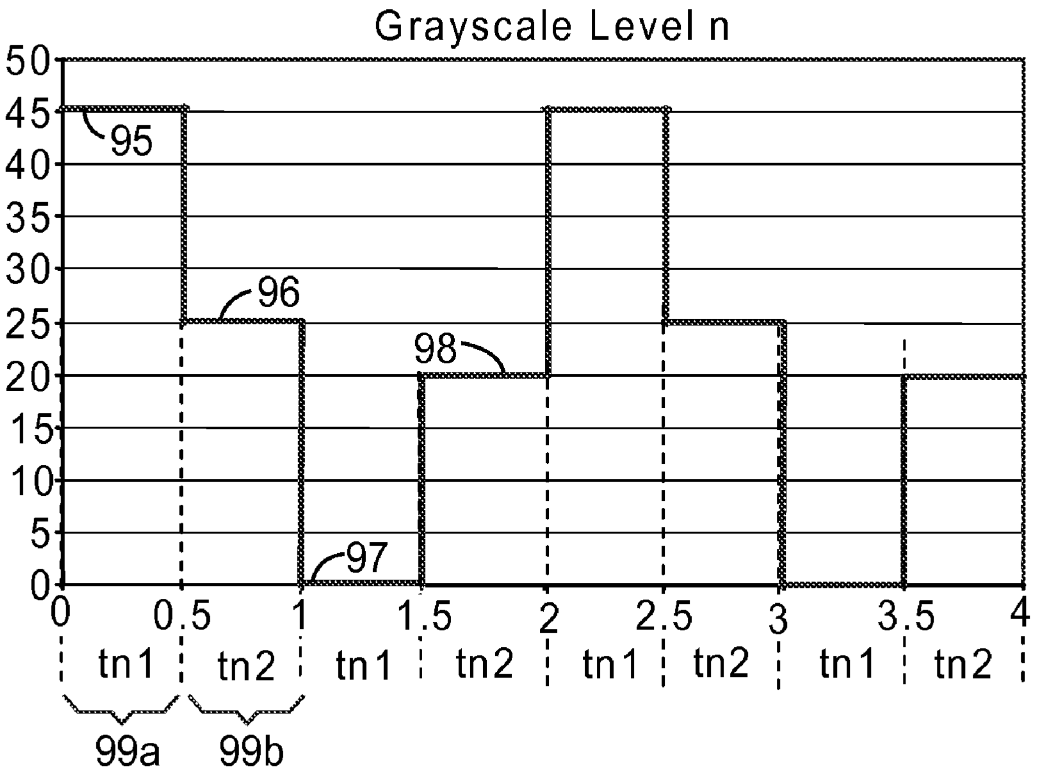
FIG. 9C shows an exemplary column voltage signal over two periods resulting in a desired level of gray scale for use in pulse width modulation.

A drive system consistent with the present disclosure can also use pulse width modulation to generate column voltage signals as illustrated in FIGS. 9A-9C. The exemplary column voltage signals shown in FIGS. 9A-9C can be used in combination with row voltage signals such as the exemplary signals shown in FIGS. 7A-7B. Row voltage signals and column voltage signals should have the same frequency and period.

The column voltage signal illustrated in FIG. 9A can change a pixel's state to planar reflective. The maximum voltage level 91 is approximately equal to or greater than V4, and the minimum voltage level 92 is approximately zero. The column voltage signal shown in FIG. 9A is approximately in-phase with the row voltage signal shown in FIG. 7B. When the voltage signal shown in FIG. 9A is applied to a given column, the pixel in that column receiving a row voltage signal as illustrated in FIG. 7A will receive a cumulative voltage signal alternating between negative and positive V4, and will be changed to a planar reflective state regardless of the pixel's initial state. Pixels receiving a row voltage signal as shown in FIG. 7B receive a cumulative voltage signal alternating between the negative and positive of the difference between V3 and V4 divided by two ((V3−V4)/2).

The column voltage signal illustrated in FIG. 9B can change a pixel's state to focal conic. The maximum voltage level 93 is approximately equal to V3 and the minimum voltage level 94 is approximately equal to the difference between V4 and V3. When the voltage signal shown in FIG. 9B is applied to a given column, the pixel in that column receiving a row voltage signal as illustrated in FIG. 7A receives a cumulative voltage signal alternating between positive and negative V3, a voltage level sufficient to drive the pixel state to focal conic. The pixels in that column receiving a row voltage signal such as illustrated in FIG. 7B will receive a cumulative voltage signal alternating between the positive and the negative of the difference between V4 and V3 divided by two ((V4−V3)/2). Because this signal is less than or equal to V1, the state of the pixels receiving this signal will not change.

The column voltage signal illustrated in FIG. 9C can drive a pixel to a desired level of gray scale, n, within a range of 0 to N-1 levels, where N is the total number of desired levels of gray scale. The signal shown in FIG. 9C extends over two periods, and each period is broken into four time segments, two of each of t1 99*a* and t2 99*b*. The exemplary signal in FIG. 7C cycles through four voltage levels during each period. The first voltage level 95 can have a time period of tn1 and is approximately equal to or greater than V4. Voltage level 95 is sufficiently high to change a pixel to a planar reflective state. The second voltage level 96 can have a time period of t2 and is approximately equal to V3. Voltage level 96 can change a pixel state to a weakly scattering focal conic state. The third voltage level 97 can be 0V and is sufficiently low that it cannot substantially change a pixel state. The fourth voltage level 98 is the difference between the first voltage level 95 and the second voltage level 96.

Time periods t1 and t2 can be determined by using the following equations:

$$t1 = \frac{n \times driveperiod}{2(N-1)}$$

$$t2 = \frac{(N-1-n)(driveperiod)}{2(N-1)}$$

where drive period is a length of time inversely proportional to a frequency of oscillation of the row voltages.

Alternatively, the order of voltage levels can be rearranged to tune a display. However, a first voltage level 95 and third voltage level 97 should still have corresponding time periods of length t1 and a second voltage level 96 and fourth voltage level 98 should still have corresponding time periods of length t2.

Any desired number of shades of gray scale can be achieved by choosing a corresponding value for N. Shades of gray scale, n, ranging from 0 to N-1 are equally spaced.

While the signals shown in FIGS. 7A-9C extend over two drive periods, a signal can be repeated over any desired number of periods to write a pixel. For example, a signal can be transmitted over 1 to 10 periods, or in one embodiment over 2 to 4 periods, or over any other desired number of periods.

Although the present disclosure has been described with reference to preferred embodiments, those of skill in the art will recognize that changes can be made in form and detail without departing from the spirit and scope of the present disclosure.

What is claimed is:

1. A method for driving at least a portion of a passive matrix display system having rows and columns forming pixels, comprising steps of performed in the following order:

(a) driving the pixels of the passive matrix display system to a homeotropic state by outputting a first voltage pulse to the rows;

(b) driving the pixels of the passive matrix display system to a focal conic state;

(c) resetting the pixels by driving the passive matrix display system to a homeotropic state by outputting a second voltage pulse to the rows;

(d) waiting for a predetermined period of time within the range of 1 microsecond to 6 milliseconds;

(e) outputting to the rows a first row voltage signal, wherein the first row voltage signal is applied to the row of the matrix being written, and outputting to the rows a second row voltage signal, wherein the second row voltage signal is applied to all the rows of the matrix not being written.

2. The method of claim 1, further comprising outputting to the columns a column voltage signal, wherein the column voltage signal, when combined with the first row voltage signal, will drive a pixel to a desired state.

3. The method of claim 2, wherein the desired state is a desired level of a gray scale.

4. The method of claim 1, wherein the passive matrix display system comprises a cholesteric liquid crystal display.

5. The method of claim 1, wherein the resolution of the cholesteric liquid crystal display is in the range of 1 dpi to 10 dpi.

6. The method of claim 1, wherein the voltage pulse has a frequency within the range of 100 hertz to 1,000 hertz.

7. The method of claim 1, wherein the first row voltage signal and the second row voltage signal have frequencies within the range of 50 hertz to 500 hertz.

8. The method of claim 7, wherein each of the rows is written over a length of 1 period to 10 periods, and the period is inversely related to the frequency of the first row voltage signal and the second row voltage signal.

9. The method of claim 1, wherein the frequency of the first voltage pulse is higher than the frequency of the first and second row voltage signals.

10. The method of claim 1, wherein the frequency of the second voltage pulse is higher than the frequency of the first and second row voltage signals.

11. A system for driving a display comprising:

(a) a passive matrix display having rows and columns forming pixels;

(b) a drive circuit configured to in the following order:

(i) drive the pixels of the passive matrix display system to a homeotropic state by outputting a first voltage pulse to the rows;

(ii) drive the pixels of the passive matrix display system to a focal conic state;

(iii) reset the pixels by outputting a second voltage pulse to the rows to drive the passive matrix display to a homeotropic state;

(iv) wait for a predetermined period of time within the range of 1 microsecond to 6 milliseconds;

(v) output to the rows a first row voltage signal, wherein the first row voltage signal is applied to the row of the matrix being written, and output to the rows a second row voltage signal, wherein the second row voltage signal is applied to all the rows of the matrix not being written; and (c) a controller electrically coupled to the passive matrix display and the drive circuit, wherein the controller controls the first and second voltage pulse, the first row voltage signal and the second row voltage signal.

12. The system of claim 11, further comprising a column driver configured to output to the columns a column voltage signal, wherein the column voltage signal, when combined with the first row voltage signal, will drive a pixel to a desired state.

13. The system of claim 12, wherein the desired state is a desired level of a gray scale.

14. The system of claim 11, wherein the passive matrix display system comprises a cholesteric liquid crystal display.

15. The system of claim 11, wherein the passive matrix display system comprises a plurality of active layers, wherein each of the layers is independently driven by the drive circuit.

16. The system of claim 11, wherein the resolution of the cholesteric liquid crystal display is in the range of 1 dpi to 10 dpi.

17. The system of claim 11, wherein the first voltage pulse and second voltage pulse have a frequency within the range of 100 hertz to 1,000 hertz.

18. The system of claim 11, wherein the first row voltage signal and the second row voltage signal have frequencies within the range of 50 hertz to 500 hertz.

19. The system of claim 11, wherein the frequency of the first voltage pulse is higher than the frequency of the first and second row voltage signals.

20. The system of claim 11, wherein the frequency of the second voltage pulse is higher than the frequency of the first and second row voltage signals.

* * * * *